July 1, 1930.                    E. DEUTSCH                    1,768,893
                              TELEVISION APPARATUS
                              Filed May 9, 1929         2 Sheets-Sheet 1
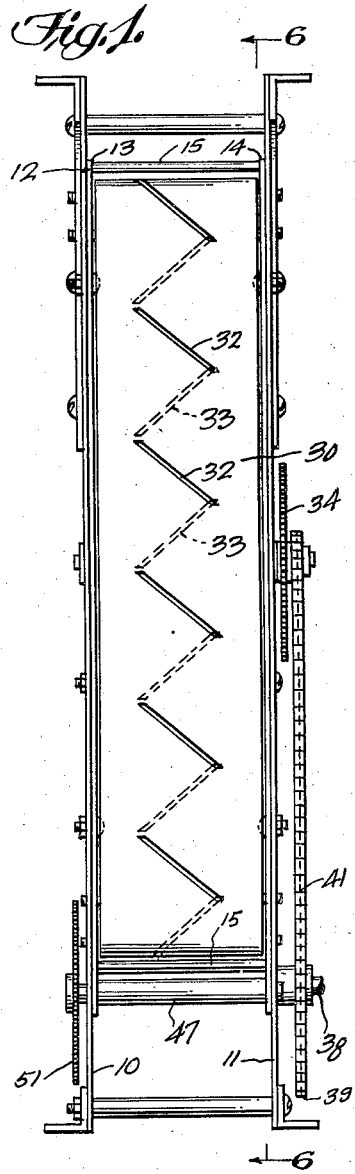
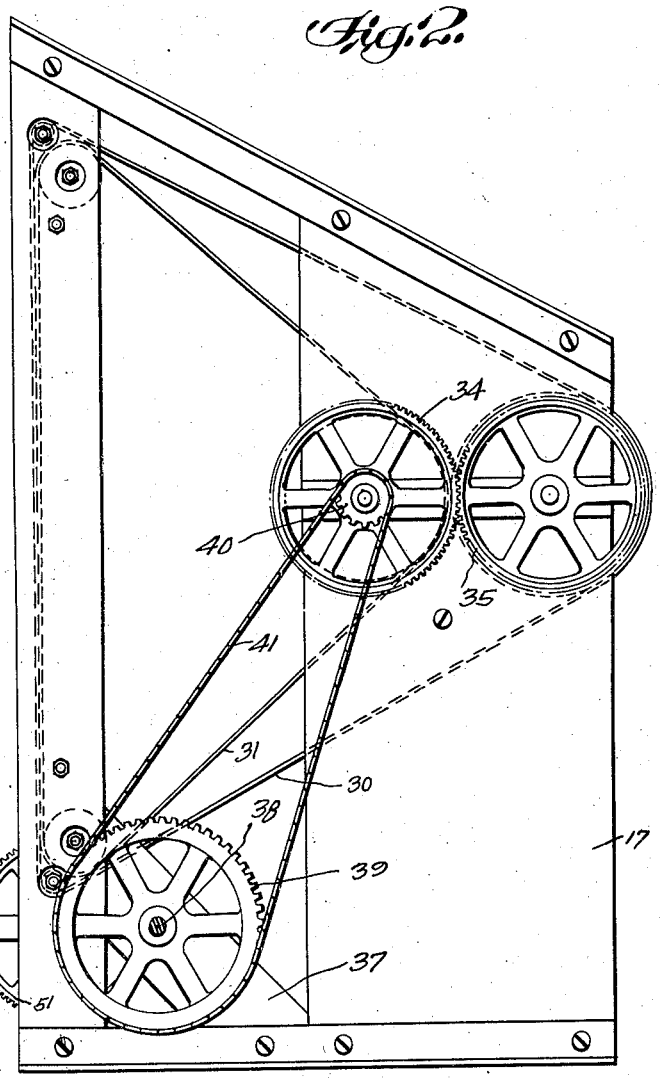
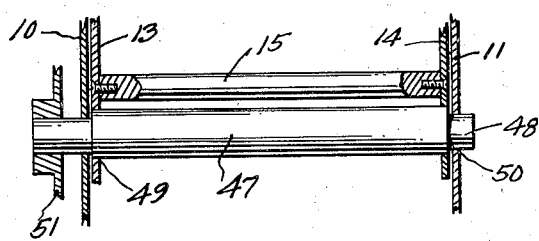
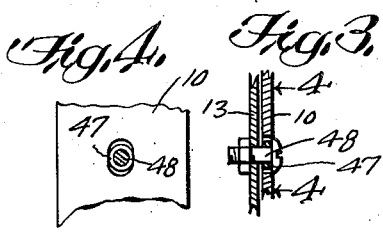
INVENTOR.
Ernest Deutsch
BY
ATTORNEY.

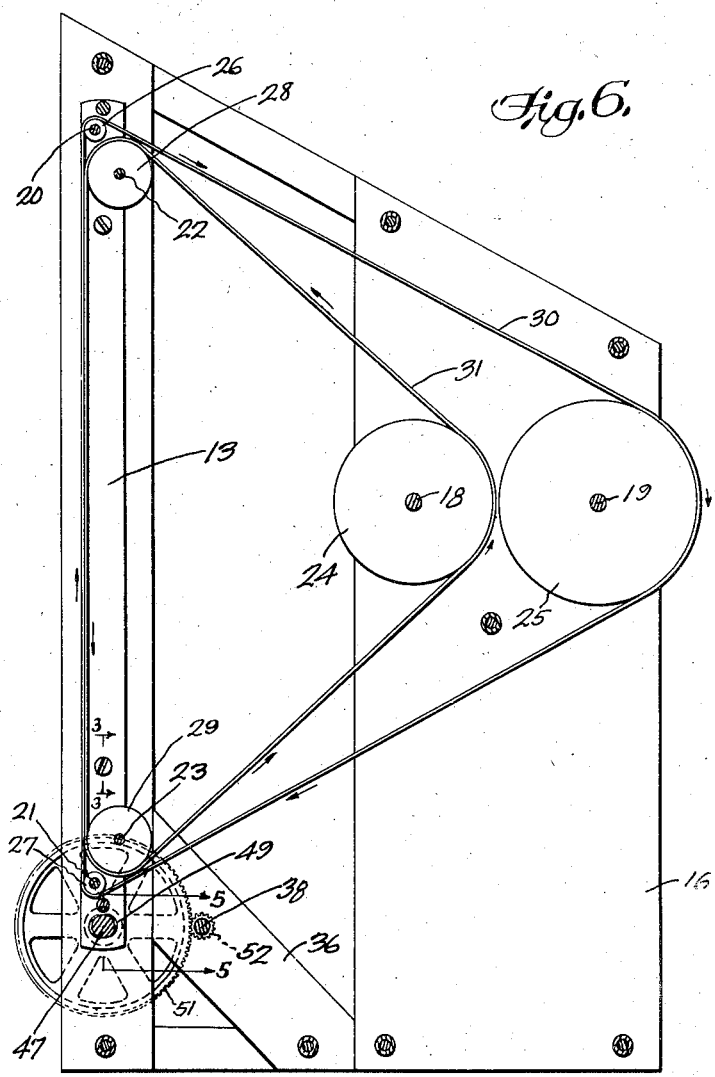
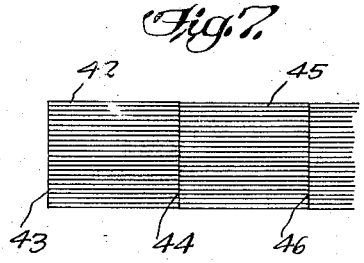
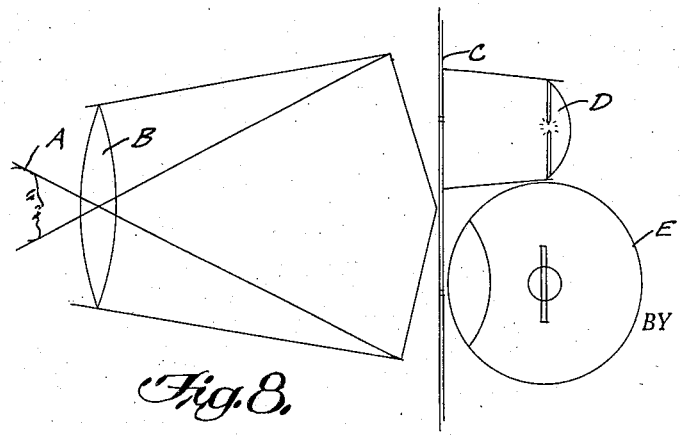

Patented July 1, 1930

1,768,893

UNITED STATES PATENT OFFICE

ERNEST DEUTSCH, OF CHICAGO, ILLINOIS

TELEVISION APPARATUS

Application filed May 9, 1929. Serial No. 361,824.

This invention relates to certain novel improvements in scanning devices for television systems and includes among its objects the provision of an improved device of this character which will have a transverse line of action.

Another object of the invention is to provide an advancing device arranged so that the transverse line of action may be advanced longitudinally.

Still another object of the invention is to provide a device of the above named character which may be used in either the transmitting or receiving device.

A further object of the invention is to provide a device of the above named character which will be such that the number of photoelectric cells required may be reduced which will result in a reduction of the number of attendant mechanisms required.

A still further object of the invention is to provide a device of the above named character which may be used in connection with either direct or indirect illumination of the object to be transmitted.

Other and further objects will be apparent from the following description wherein reference is made to the accompanying drawings, in which:

Fig. 1 is a front elevational view of a preferred form of construction for my invention;

Fig. 2 is a side elevational view of the device as depicted in Fig. 1;

Fig. 3 is a sectional detail view taken on the line 3—3 on Fig. 6;

Fig. 4 is a sectional detail view taken on the line 4—4 on Fig. 3;

Fig. 5 is a sectional detail view taken on the line 5—5 on Fig. 6;

Fig. 6 is a sectional detail view taken on the line 6—6 on Fig. 1;

Fig. 7 is a schematic view depicting diagrammatically the scanning lines and the successive advancement thereof; and Fig. 8 is a diagrammatic view depicting a typical arrangement of my improved device.

In the accompanying drawings I have illustrated the preferred form of construction for my invention and referring more particularly to Fig. 8 wherein a typical transmission device is diagrammatically depicted A indicates the object to be transmitted and B indicates a prism arranged intermediate the object A and a source of light D. The scanning device C directs a beam of light from the source D thru the prism B successively over the surface of the object A and the thus directed beam of light is reflected back thru the prism B to a photo-electric cell E of approved character for transmission in the understood manner and a scanning device C, controls this communication. My invention relates to the scanning device and is now to be described.

The device comprises an outer frame consisting of sides 10 and 11. Arranged for vertical movement relative to the outer frame is an inner frame 12 having sides 13 and 14 connected by suitable braces 15. The frame 11 also includes relatively wide plates 16 and 17 (Figs. 2 and 6) arranged rearwardly of the plates 13 and 14. Journaled in the plates 16 and 17 and extending therebetween are shafts 18 and 19 which are horizontally aligned. Journaled in the plates 13 and 14 are shafts 20 and 21 which extend between said plates and which are vertically aligned. Similarly journaled and disposed are shafts 18 and 19. Pulleys 26 and 27 are fixed on the shafts 20 and 21 while pulleys 28 and 29 are fixed on the shafts 22 and 23.

An endless belt 30 is directed around the pulleys 19, 26, and 27. An endless belt 31 is disposed interiorly of the belt 30 and around the pulleys 18, 28, and 29. In the belt 30 a plurality of slots 32 are formed that are spaced apart in predetermined amounts and which are angularly disposed in parallel relation. In the belt 31 a plurality of slots 33 are formed which are similarly disposed but which extend in angular direction opposite to the slots 32 but the angularity of these with respect to the horizontal is equal. The ends of the slots 31 and 32 are aligned.

As can be seen best by referring to Fig. 2 the shafts 18 and 19 have meshing gears 34 and 35 mounted on the ends thereof extending thru plate 17. An angularly disposed strip 36 extends between plates 13 and 16 and aligned therewith is a strip 37 which extends between strips 14 and 17. A shaft 38 is journaled in the strips 36 and 37 and one end thereof is extended in order that a power supply may be connected thereto. A sprocket 39 is mounted on the extended portion of shaft 38 and a sprocket 40 is mounted on shaft 18. A chain 41 extends between sprockets 39 and 40 and therefore rotation of shaft 38 is transmitted to shaft 18, thence thru gears 34 and 35 to shaft 19 which rotates in a direction of rotation of shaft 18. Therefore, belts 30 and 31 are operated in opposite directions.

In view of the opposite travel of belts 30 and 31 it is apparent that the slots 32 and 33 move into alignment and the aligned portions of these slots will lie in lines disposed transversely of the belts as the slots move toward each other. The disposition of the slots is such that the successive transverse lines of registration are disposed relative to each other in the manner illustrated by the lines 42 in Fig. 7. These lines 42 represent the scanning lines and in order to attain the dot arrangement commonly employed the source of light D may be intermittently operated.

It is manifest that the spacing between the lines 42 is excessive for the purpose intended. Therefore at the time one scanning is completed; that is, successive registration of all of the slots 32 and 33 as represented by the lines 42 between the lines 43 and 44 the device is arranged so that a second scanning will be carried out as represented by the lines 45, between the lines 44 and 46. This secondary scanning of each full scanned field is in a distort appearing position, so that each field appears sixteen times a second in different heights of spaces of about $\frac{1}{16}$ of an inch, is the means to carry out the further described idea. It is apparent that the lines 45 are disposed slightly below the lines 42. This is accomplished in the following manner.

It has been stated that the frame 12 is supported between the sides 10 and 11 for vertical movement. This support includes the eccentric roller 47 carried on the shaft 48 which is journaled in the sides 10 and 11. Slots 49 and 50 are formed in the plates 13 and 14 respectively, thru which the roller 47 is extended. A gear 51 is fixed on shaft 48 which meshes with the pinion 52 on shaft 38. At the start of the operation the major axis of roller 47 is horizontally disposed. The ratio between pinion 52 and 51 is such that at the time the scanning represented by line 42 is completed that the registration of the starting slots, represented by the first of the lines 42 and 47, will occur in a lower plane as indicated by the lines 45 by reason of lowering of the frame 15 because of rotation of the roller 47. This operation is carried out until the area between the lines 42 has been scanned. It is manifest that movement of the frame 15 is relative to the source D and the object A.

While the device has been described in connection with a transmitting device it is to be understood that it may be used with a receiving device without departing from the purview of the invention. It is also manifest that I have provided a device which will very effectively carry out the above set forth objects.

In the above description I have set forth a preferred form of construction and arrangement for my device but it is to be understood that this is capable of variation and modification such as changes in style, shape, size, and materials, without departing from the spirit and scope of the invention set forth in the appended claims.

I claim:

1. In a device of the character stated, co-operating means having angularly disposed openings therein, means for operating said first named means to successively move portions of said openings into alignment whereby the portions of said openings will align in a plane extending transversely of said first named means, and means for moving said first named means whereby said portions of corresponding openings will successively move into alignment in planes parallel to said first named plane but disposed from alignment therewith.

2. In a device of the character stated, means for supporting endless belts in superimposed relation, said belts having angularly disposed openings therein, and means for moving said belts in opposite directions to successively move the openings in said belts into alignment with each other, said openings extending in opposite directions whereby the portions thereof will align in a plane extending transversely of said belts, and means for moving said belt supporting means whereby corresponding openings will successively align in planes parallel to but disposed from alignment with said first named plane.

3. In a device of the character stated, means for supporting endless belts in superimposed relation, said belts having angularly disposed openings therein, and means for moving said belts in opposite directions to successively move the openings in said belts into alignment with each other, said openings extending in opposite directions whereby the portions thereof will align in a plane extending transversely of said belts, said openings being spaced apart in amounts such that successive openings will align in planes disposed from alignment with said first named plane, and means for moving said belt supporting means whereby corresponding openings will successively align in planes parallel to but disposed from alignment with said first named plane.

4. In a device of the character stated, a supporting frame, sets of pulleys rotatably journaled in said supporting frame, endless belts directed over said sets of pulleys in superimposed relation, said belts having angularly disposed openings formed therein, and means for rotating said belts to successively move said openings into alignment with each other, another frame, means carried by said last named frame for supporting said supporting frame, and means for operating said last named means to move said supporting frame relative to said other frame.

5. In a device of the character stated, a supporting frame, sets of pulleys rotatably journaled in said supporting frame, endless belts directed over said sets of pulleys in superimposed relation, said belts having angularly disposed openings formed therein, and means for rotating said belts to successively move said openings into alignment with each other, said openings in each of said belts being spaced apart such that cooperating pairs of openings will have the portions thereof successively align in a plane transverse of said belt while successive cooperating pairs of openings will align in planes disposed from alignment with said first named plane, another frame, means carried by said last named frame for supporting said supporting frame relative to said other frame.

6. In a device of the class described, a supporting frame, sets of pulleys rotatably journaled in said supporting frame, endless belts directed over said sets of pulleys in superimposed relation, said belts having angularly disposed openings formed therein, means for imparting movement to said belts to successively move said openings into alignment with each other and means for moving the belt supporting means whereby corresponding openings will successively align in planes parallel to but disposed from alignment with said first named plane.

7. In a device of the class described, a supporting frame, superimposed belts mounted for movement in said frame, said belts having angularly disposed openings formed therein, and means for imparting movement to said belts to successively move said openings into alignment with each other, a second frame, means carried by the second frame for supporting said supporting frame, and means for operating said last named means to move said supporting frame relative to said second frame.

In witness whereof I have hereunto set my hand this 20th day of March, A. D. 1929.

ERNEST DEUTSCH.